(12) United States Patent
Chandhoke et al.

(10) Patent No.: US 11,256,641 B2
(45) Date of Patent: Feb. 22, 2022

(54) ASYNCHRONOUS START FOR TIMED FUNCTIONS

(71) Applicant: NATIONAL INSTRUMENTS CORPORATION, Austin, TX (US)

(72) Inventors: Sundeep Chandhoke, Austin, TX (US); Richard L. Ratzel, Austin, TX (US); Aaron T. Rossetto, Austin, TX (US)

(73) Assignee: National Instruments Corporation, Austin, TX (US)

( * ) Notice: Subject to any disclaimer, the term of this patent is extended or adjusted under 35 U.S.C. 154(b) by 402 days.

(21) Appl. No.: 15/417,765

(22) Filed: Jan. 27, 2017

(65) Prior Publication Data

US 2018/0217954 A1    Aug. 2, 2018

(51) Int. Cl.
*G06F 13/368* (2006.01)
*G06F 13/40* (2006.01)

(52) U.S. Cl.
CPC ........ *G06F 13/368* (2013.01); *G06F 13/4068* (2013.01)

(58) Field of Classification Search
None
See application file for complete search history.

(56) References Cited

U.S. PATENT DOCUMENTS

| | | |
|---|---|---|
| 6,983,393 B2 | 1/2006 | Truchard |
| 7,453,906 B2 * | 11/2008 | Simonnet ................ H04L 29/06 370/252 |
| 7,529,887 B1 * | 5/2009 | Haase ................. G06F 11/1076 711/114 |
| 8,127,059 B1 | 2/2012 | Carr et al. |
| 8,295,287 B2 | 10/2012 | Chandhoke |
| 8,307,136 B2 | 11/2012 | Feiereisel |
| 8,458,371 B2 | 6/2013 | Scorsi |
| 9,246,852 B2 | 1/2016 | Chandhoke |

(Continued)

OTHER PUBLICATIONS

Intel—"Intel Ethernet Controller i210 Datasheet"—Order No. 333016-007, Revision No. 3.3—Jun. 2018—(872 pages).

(Continued)

*Primary Examiner* — Henry Tsai
*Assistant Examiner* — Christopher A Bartels
(74) *Attorney, Agent, or Firm* — Kowert, Hood, Munyon, Rankin and Goetzel P.C.; Jeffrey C. Hood

(57) ABSTRACT

Asynchronous event-based start of input/output operations is implemented in a distributed system. Within the distributed system, each master device—of a plurality of master devices coupled to a respective plurality of slave devices via an internal network—may implement one or more timed-functions configured to control timing of physical input operations and/or physical output operations for the respective plurality of slave devices, and streams between the master device and the respective plurality of slave devices. A subset of the slave devices may be further interconnected via a shared signal-based bus, which may be used to propagate an asynchronous event that may be used to start at least one of the one or more timed functions implemented on a master device coupled to at least one slave device of the subset of slave devices. The asynchronous event may be generated by one of the slave devices.

20 Claims, 12 Drawing Sheets

(56) References Cited

U.S. PATENT DOCUMENTS

| | | | |
|---|---|---|---|
| 9,270,481 B2* | 2/2016 | Lessmann | H04L 47/564 |
| 10,110,679 B2 | 10/2018 | Chandhoke | |
| 10,698,377 B2* | 6/2020 | Siddique | G05B 19/0423 |
| 2002/0133646 A1 | 9/2002 | Cheung et al. | |
| 2003/0172221 A1* | 9/2003 | McNeil | G06F 15/8023 |
| | | | 710/305 |
| 2004/0148460 A1 | 7/2004 | Steinmetz et al. | |
| 2008/0133779 A1 | 6/2008 | Ho et al. | |
| 2008/0235415 A1 | 9/2008 | Clark et al. | |
| 2009/0103362 A1 | 4/2009 | Pekny et al. | |
| 2009/0137318 A1 | 5/2009 | Russo et al. | |
| 2011/0153910 A1 | 6/2011 | MacKenna et al. | |
| 2012/0137075 A1 | 5/2012 | Vorbach | |
| 2012/0215891 A1* | 8/2012 | Lessmann | H04L 41/145 |
| | | | 709/220 |
| 2012/0297043 A1 | 11/2012 | Davis et al. | |
| 2012/0324147 A1 | 12/2012 | Lai | |
| 2013/0060993 A1 | 3/2013 | Park | |
| 2013/0325998 A1 | 12/2013 | Hormuth et al. | |
| 2013/0336338 A1* | 12/2013 | Armbruster | H04J 3/0647 |
| | | | 370/503 |
| 2014/0071982 A1* | 3/2014 | Chandhoke | H04J 3/06 |
| | | | 370/355 |
| 2014/0200684 A1* | 7/2014 | Mizutani | G05B 19/4185 |
| | | | 700/23 |
| 2014/0281057 A1 | 9/2014 | Cohen et al. | |
| 2015/0039099 A1* | 2/2015 | Mizutani | G05B 15/02 |
| | | | 700/3 |
| 2016/0173416 A1* | 6/2016 | Edmiston | G06F 9/4843 |
| | | | 370/419 |
| 2016/0359978 A1* | 12/2016 | Chandhoke | H04L 67/125 |
| 2017/0039162 A1* | 2/2017 | Mishra | G06F 13/4282 |
| 2017/0075336 A1* | 3/2017 | Ueda | G05B 23/0264 |
| 2018/0062919 A1* | 3/2018 | Justin | H04L 41/0803 |
| 2018/0159739 A1* | 6/2018 | D'Ercoli | H04L 12/18 |
| 2018/0217954 A1 | 8/2018 | Chandhoke | |
| 2020/0259896 A1* | 8/2020 | Sachs | H04W 12/03 |

OTHER PUBLICATIONS

Chandhoke et al., U.S. Appl. No. 15/466,150, entitled "Direct Network Access by a Memory Mapped Peripheral Device for Scheduled Data Transfer on the Network", filed Mar. 22, 2017, 48 pages.

Non-Final Office Action in U.S. Appl. No. 15/466,150, dated Sep. 10, 2018, 11 pages.

Final Office Action in U.S. Appl. No. 15/466,150, dated Mar. 21, 2019, 16 pages.

Non-Final Office Action in U.S. Appl. No. 15/466,150, dated Aug. 12, 2019, 12 pages.

* cited by examiner

ASYNCHRONOUS START FOR TIMED FUNCTIONS

FIELD OF THE INVENTION

The present invention relates to the field of distributed systems, and more particularly to timed functions for distributed decentralized real time systems.

DESCRIPTION OF THE RELATED ART

Hard real time Ethernet based fieldbus technologies that use time-based synchronization (e.g., EtherCAT (Ethernet for Control Automation Technology) and PROFINET-IRT (PROFINET Isochronous Real Time)) schedule real time streams on the network to ensure timeliness of data delivery from the physical inputs (sensors) to the control function and from the control function to the physical outputs (actuators). These technologies generally operate in the traditional fieldbus model where one or more control functions are implemented on one "master" device and the sensors and actuators (physical inputs and outputs) are implemented on or by one or more "slave" devices. This master-slave model defines a centralized control architecture where the input/output (I/O) is decentralized but the control functions are centralized. An exemplary prior art master/slave system with this architecture is shown in prior art FIG. 1A. As may be seen, in this architecture, the slaves (slave devices) do not implement the main control functionality; their primary purpose is to serve physical input data to the centralized control function(s) implemented on the master (master device), and to receive output data from the centralized control function(s) on the master and update the physical outputs. This approach simplifies the task of a schedule generator calculating the network schedule for the real time (data) streams considerably, since the schedule generator only needs to coordinate the reading of the physical inputs (input latch) on each slave device with the arrival time of a real time stream, and the writing of the physical outputs (output update) on each slave with the transmission time of a real time stream.

However, this master-slave approach (centralized distributed model) is not suited for distributing the control function among multiple masters (master devices or processes). In this centralized distributed model there is typically only one input/output update (I/O scan) for each control function implemented on the master, so the schedule generator has to determine a common time (referred to as a synchronization point) when all the slaves latch their inputs, and a common time when the slaves update their outputs for the I/O scan. As shown in prior art FIG. 1B, this is a rather simple calculation for the schedule generator because the synchronization point can be scheduled separately for inputs and outputs at any time on the slave devices during the compute time on the master. This way when the I/O scan runs, the real time streams from the slaves provide the master with new data latched at the same input synchronization point on all the slave devices. New data received by the slaves from the master is stored on the slaves and updated at the output synchronization point at the same time on all the slaves.

New time-sensitive networking technologies being defined in IEEE 802.1 enable coexistence of real time traffic with non-real time traffic on the same network, thereby permitting the "masters" (e.g., master devices) of independent fieldbus networks to exchange data amongst themselves in real time (with guarantees in timeliness of delivery). An exemplary prior art decentralized distributed system is illustrated in prior art FIG. 2, where, as may be seen, a device implementing a centralized schedule generator is connected via a switch (or bridge) to a plurality of master devices, each master device being coupled to a respective plurality of slave devices. As indicated in the Legend, these slave devices implement I/O functionality with respect to various devices attached thereto, e.g., actuators, sensors, motors, etc., as well as the master devices. More specifically, as FIG. 2 indicates, the I/O functionality of a slave device may include implementation of interfaces to attached devices, e.g., sensors and actuators (including motors), management of output data received from the slave's master in one or more streams, and generation of one or more streams (i.e., data streams) to send input data to the master.

Exemplary data streams are also illustrated in FIG. 2, where, as indicated in the top right of the figure, stream 1 (so labeled) is an exemplary input stream from a "drive" slave device (that drives a motor) to Master A, stream 2 is an exemplary output stream from Master A to the "drive" slave device, e.g., control signals for controlling the motor, stream 3 is an exemplary stream from Master A to Master C, and stream 4 is an exemplary stream from Master D to Master A.

This architecture may permit new models for control functions to be defined where control implemented on one master can be distributed among multiple masters. More recently, the architecture shown in FIG. 2 has been further improved to enable a centralized schedule generator to schedule control functions implemented on each master with respect to each other and with respect to a network's schedule for real time streams exchanged between the masters. In such improved system(s) the schedule generator(s) may compute future time events to start the operations for performing the physical input/output operations on the slave devices as well as transmission of streams between the master devices and between each master device and its slave devices. However, in many applications the start event is confined to an asynchronous event, the occurrence of which cannot be scheduled a priori. The support of such asynchronous events would make the system more versatile and consequently more useful.

Other corresponding issues related to the prior art will become apparent to one skilled in the art after comparing such prior art with the present invention as described herein.

SUMMARY OF THE INVENTION

Various embodiments of a system and method for scheduling an asynchronous start for timed functions in a real time system are presented below.

A broad range of applications are currently driving the need for distributed data acquisition and control. Examples of such applications include infotainment, industrial control, power transmission and/or generation, transportation control, automotive control, avionics, home networks, media converters, machine/structural health monitoring, and real-time testing, just to name a few. Such applications require the same level of synchronization over a network as achieved inside a chassis. Timely transfer of data from sensors to processing units is becoming increasingly important for "closing the loop" over the network, efficient bandwidth utilization of the network, and reducing cycle time (increasing productivity).

In various embodiments, precise chassis to chassis synchronization and a time-based distributed data acquisition and control architecture helps solve demanding control and measurement applications. The architecture may incorporate the use of time sensitive networking features (e.g. over Ethernet) to distribute time, and enable timely data transfer (e.g. transfer of control data and/or waveform data) in a network connecting a system composed of multiple chassis. The architecture may also incorporate mapping of intra-chassis (signal based) synchronization to inter-chassis (time-based) synchronization without compromising precision accuracy, and may enable heterogeneous network synchronization, e.g. synchronization with non-Ethernet and also Ethernet based deterministic networks.

An apparatus for scheduling a decentralized distributed system (which may be a real-time decentralized distributed system in some embodiments) may be provided that includes at least one centralized configuration device, configured to implement at least one schedule generator. The at least one centralized configuration device may be configured to couple to a plurality of master devices, where each master device is connected to a respective plurality of slave devices. Each master device may include one or more timed functions configured to control timing of physical input operations and/or physical output operations for the respective plurality of slave devices, and streams between the master device and the respective plurality of slave devices. The at least one schedule generator may be configured to receive temporal properties from respective timed functions executing on the master devices, and to receive associations between the timed functions and streams between the master devices (which are distinct from streams between a master device and its slave devices). The at least one schedule generator may be further configured to generate respective schedules for the master devices based at least in part on the temporal properties and the associations, and distribute the respective schedules to the master devices, where the respective schedules are useable by the master devices to control execution of the timed functions and the streams between the master devices in real time in a coordinated manner. In some embodiments, the apparatus may be included in a decentralized distributed real time system that includes the plurality of master devices (and respective pluralities of slave devices connected thereto).

Furthermore, the apparatus may also support asynchronous events by sharing a signal-based timing infrastructure between one or more slave devices that are coupled to a master device, or between one or more slave devices coupled to different master devices. The explicit signal-based connections between the or more slave devices that are coupled to a master device, and/or between the one or more slave devices coupled to different master devices is in addition to the network which connects those devices to exchange data (streams). The signal-based connection may transport the asynchronous event for starting the physical input/output operation. To accommodate support for asynchronous event functionality for devices that share the signal-based connection, timed-functions implemented in the apparatus may include enhancements that enable/facilitate easy transition of the timed-function between execution of future time events and asynchronous (time) events. The timed-functions may start the future time events and asynchronous events and their respective associated stream transmissions.

The timed-function may accordingly include a local signal group parameter identifying the one or more slave devices interconnected via the shared signal-based bus as a local signal group. The local signal group parameter may include a description object listing all the unique local signal groups with which the timed-function can be associated, and may further include a configuration object holding information for the timed-function indicating whether the timed-function participates in one of the local signal groups supported by the timed-function. For each respective local signal group, the description object may further indicate whether the timed-function is a creator of the asynchronous event or a consumer of the asynchronous event. The description object may further indicate a latency limit for the asynchronous event, with the latency limit specifying a maximum time period during which the asynchronous event is expected to be recognized.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the preferred embodiment is considered in conjunction with the following drawings, in which.

Figure 1A:
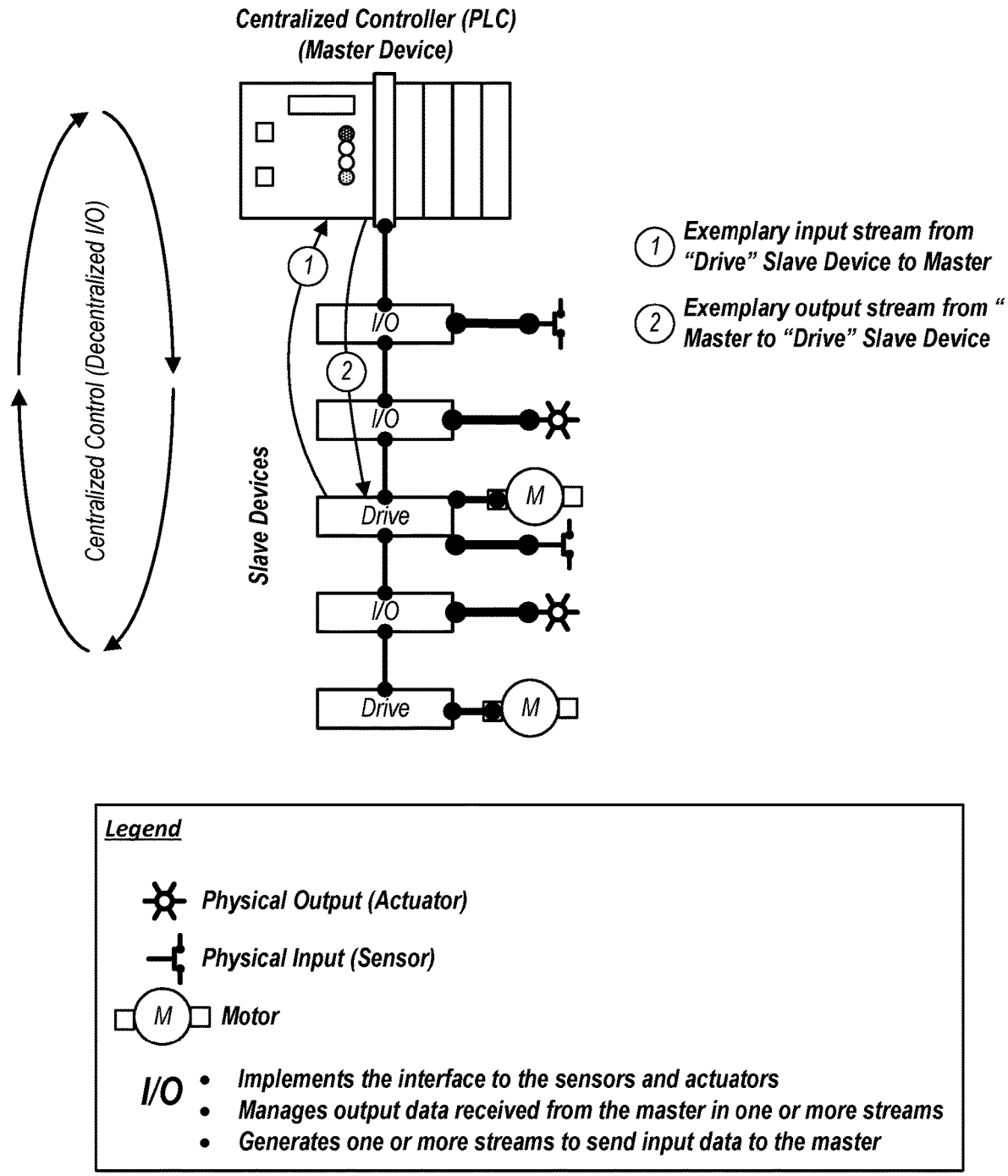
FIG. 1A illustrates a centralized master/slave system, according to prior art.
Figure 1B:
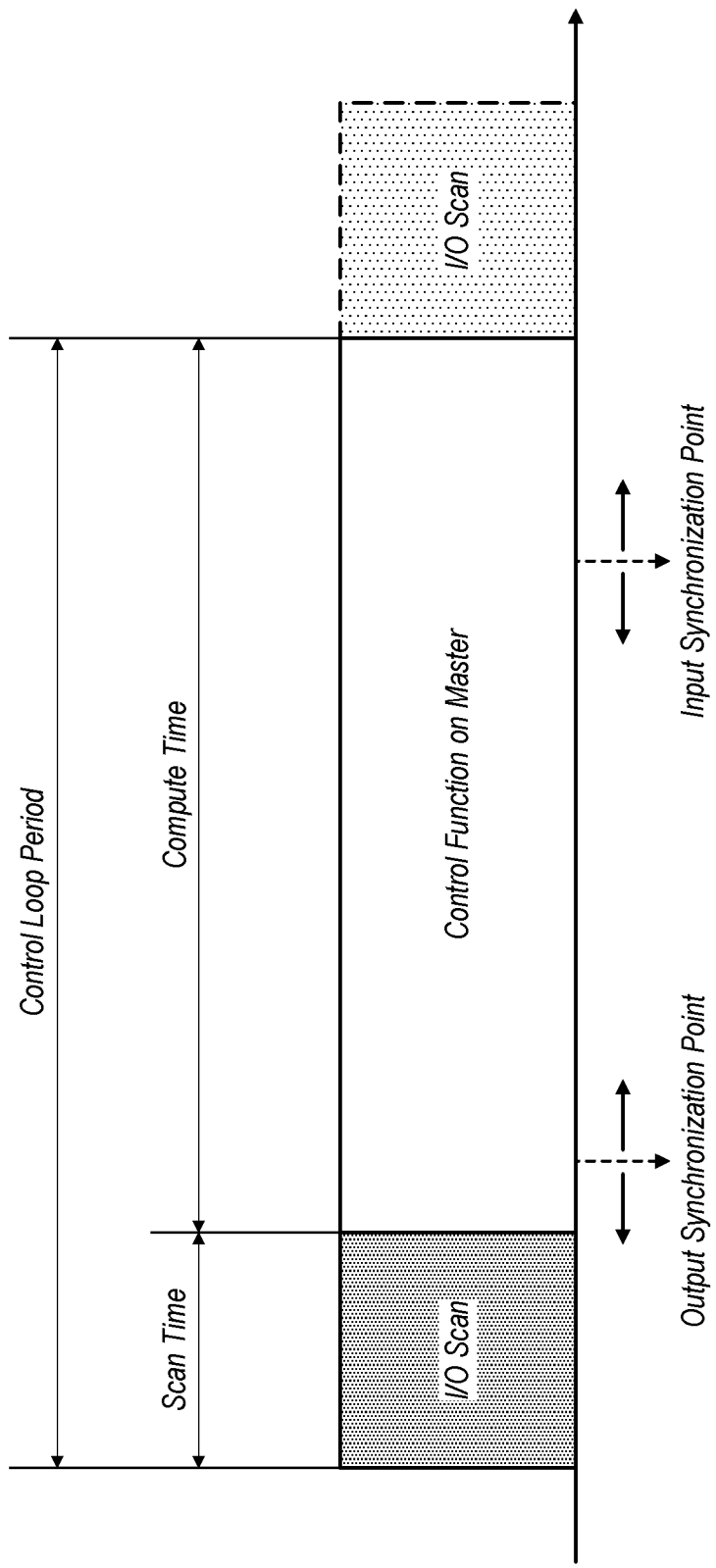
FIG. 1B illustrates synchronization and timing in the centralized master/slave system of FIG. 1A, according to the art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. patent application Ser. No. 14/054,227, titled "System and Method for Interoperability Between Multiple Networks", filed Oct. 15, 2013.

U.S. patent application Ser. No. 14/511,863, titled "System and Method for Interoperability Between Multiple Networks", filed Oct. 10, 2014.

U.S. patent application Ser. No. 14/072,297, titled "Lossless Time Based Data Acquisition and Control in a Distributed System", filed Nov. 5, 2013.

U.S. patent application Ser. No. 14/512,203, titled "Lossless Time Based Data Acquisition and Control in a Distributed System", filed Oct. 10, 2014.

U.S. patent application Ser. No. 14/840,462, titled "Timed Functions for Distributed Decentralized Real Time Systems", filed Aug. 31, 2015.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

2U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DIADem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, Snap-Master™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Said another way, data flow programs execute according to a data flow model of computation under which program functions are scheduled for execution in response to their necessary input data becoming available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the HMI (Human Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

Optimization—refers to the technical process of determining or selecting a best or improved element or configuration from a set of available alternatives with regard to some specified criteria (e.g., an objective function, and possibly constraints), and generally within some specified tolerance. Note that in practical use, an optimized system (or process) is improved (with respect to specified criteria), but may or may not be the absolute best or ideal solution. Said another way, optimization operates to improve a system or process, and may approach the mathematically optimum solution to within some tolerance, which may be dependent on the application, e.g., within 1%, 2%, 5%, 10%, etc., of the mathematically optimal solution. Thus, as used herein, the terms "optimized", "optimum", and "optimal" mean "improved with respect to specified criteria".

Global Optimization—refers to a type of optimization in which a system or process with interdependent components or sub-processes is improved by varying multiple parameters or aspects of the system or process at the same time, generally with non-linear results. Note that ideal global optimization (finding the mathematically globally optimum solution) is generally intractable, because in even moderately complex systems and processes there are many more possible configurations and resulting behaviors than can be searched or considered in a reasonable amount of time. Thus, practically, global optimization operates to improve a complex system or process by varying multiple parameters concurrently, and may approach the mathematically globally optimum solution to within some tolerance, which may be dependent on the application, e.g., within 1%, 2%, 5%, 10%, etc., of the mathematically globally optimal solution. Thus, as used herein, the terms "globally optimized", "globally optimum", and "globally optimal" mean "globally improved with respect to specified criteria". One example of a global optimization method is differential evolution, which optimizes a problem (system or process) via iterative improvement of candidate solutions with respect to some specified measure of quality.

Latency Requirements—refers to the latency (time/duration) desired by a system application for a stream regarding the time from transmission from the master device producing the stream to the time when it is received by a master device consuming the stream.

Period—refers to the cyclic rate at which the stream is transmitted, i.e., the duration of one cycle.

Timed Function Characterization—refers to the determination of the worst case execution time (WCET), and the minimum and maximum period for execution of the timed function.

Time Sensitive Stream Bandwidth—refers to the data transmitted every cycle in a stream.

Time Sensitive Stream Characterization—refers to the (transmission) tx copy time and (reception) rx copy time by a stream on a master device.

Path Computation—refers to an algorithm to compute optimal routing of a stream from a master device producing the stream to a master device consuming the stream.

Performance Metrics of the Network—refers to delays (i.e., latencies) encountered by a stream as it passes through a bridge/switch and propagation (e.g., cable) delay.

Link Speed—refers to network bandwidth available for transmission of a stream (e.g., 1 Gigabit/sec, 10 Gigabit/sec, and so forth).

Network Topology—refers to or specifies the connectivity of components of a network, e.g., the bridges/switches connecting one master device to another.

Physical I/O—refers to input and output signals for monitoring/controlling a physical system, process, or environment. For example, one exemplary physical input is a physical signal derived from a sensor or a motor drive indicating the present condition of the environment or system connected to the sensor or motor drive. Similarly, one exemplary physical output is a physical signal used to change the state of an actuator or a motor drive with the intention of causing a change to the environment or system connected to the actuator or motor drive.

Centralized Configuration Device—refers to a configuration device in a distributed system, i.e., in a networked system, that operates to configure other devices in the system, where the configuration device's functionality is not distributed, but rather is comprised within a single device or entity. In other words, the configuration device provides for centralized configuration functionality in an otherwise distributed system.

Figure 3:
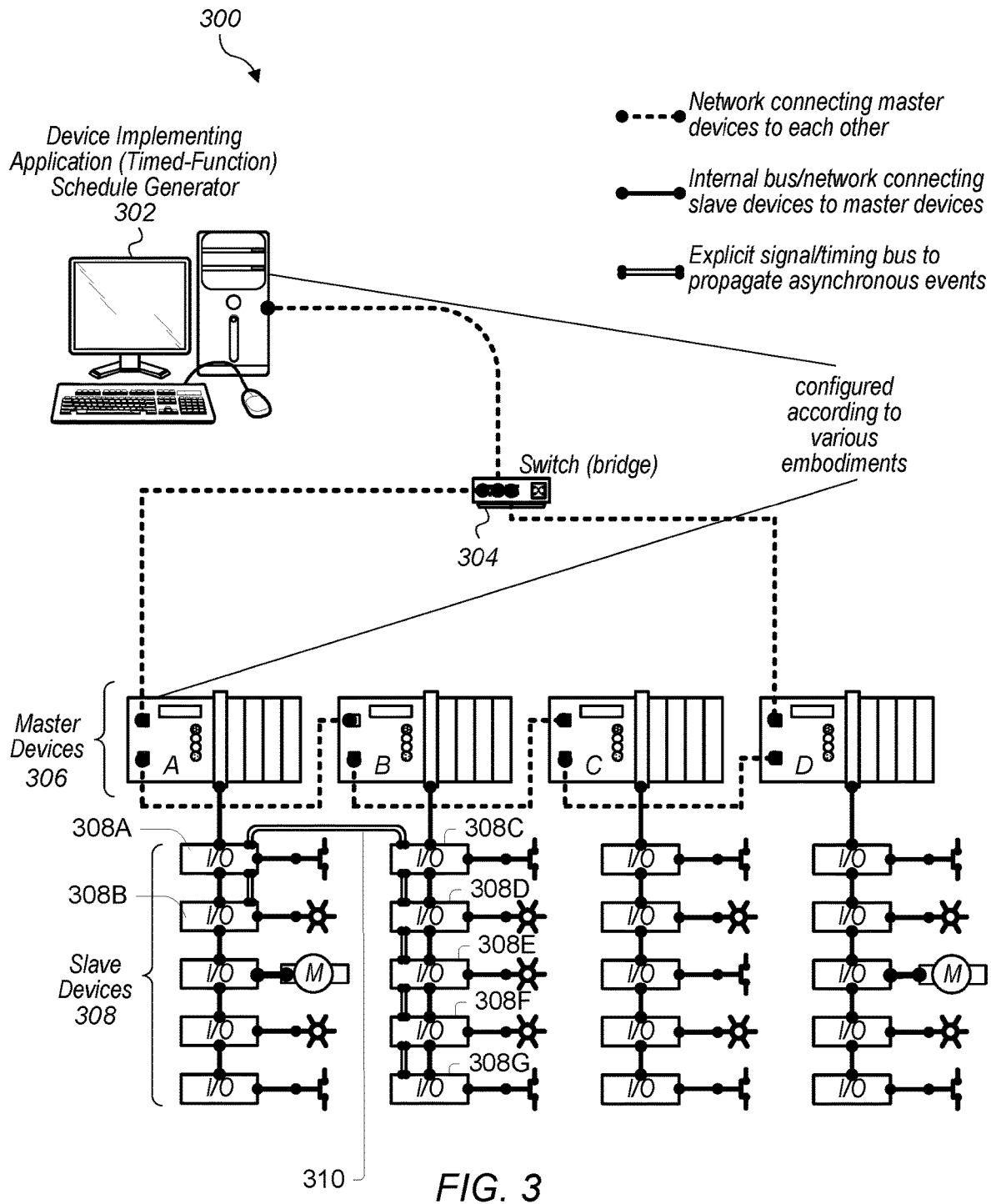
FIG. 3 illustrates an exemplary decentralized distributed system that supports asynchronous start events, according to some embodiments.

FIG. 3—Exemplary Distributed System

Figure 2:
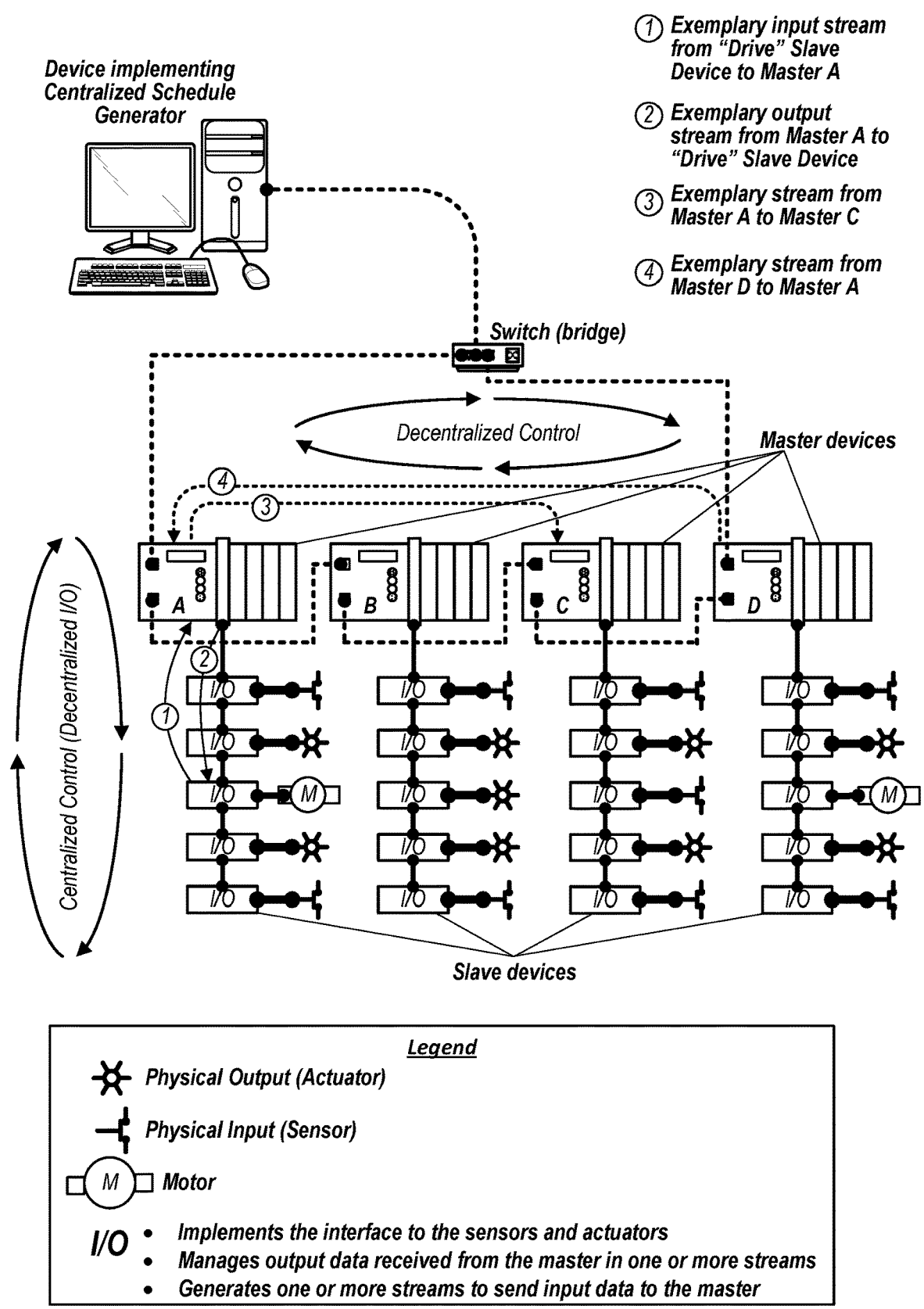
FIG. 2 illustrates a decentralized distributed master/slave system, according to prior art.

FIG. 3 illustrates an exemplary distributed system that supports asynchronous event-based starts in addition to supporting future time event-based starts, according to some embodiments. As shown, the physical hardware and architecture of this exemplary system are similar to the system of FIG. 2, but the centralized configuration device 302 and master devices 306 are configured according to embodiments of the present techniques, thus providing for real time distributed control with timed function scheduling that also supports asynchronous event-based starts.

A master device in this new decentralized control model should coordinate one or more control functions implemented on it with the arrival (or reception) and transmission of one or more real time streams exchanged between other masters and with the control functions executing on them. While scheduling of these real time streams can be performed in a manner similar to the method used by a schedule generator for Ethernet-based fieldbuses as described in the white paper titled "Profinet IRT message scheduling", by Z. Hanzalek, P. Burget, P. Sucha, Czech Technical University in Prague, Faculty of Electrical Engineering, to synchronize multiple control functions with respect to the real time stream schedule on the network requires new information from each master to be provided to the schedule generator.

In the (prior art) centralized model (or architecture) physical inputs and outputs are expected to be synchronized across the fieldbus and with respect to its master. Synchronized I/O implies a precise timing relationship between I/O performed on one device with respect to another. The decentralized distributed model has a similar requirement of synchronizing inputs and outputs, but across multiple masters, which implies I/O implemented on slaves across multiple fieldbuses.

As noted above, in the prior art centralized distributed model (e.g., of FIG. 2) there is typically only one input/output update (I/O scan) for each control function implemented on the master. In contrast, in the decentralized model 300, each master may locally execute one or more control functions which directly use the I/O on its fieldbus and indirectly use the I/O from another master's fieldbus. Accordingly, synchronizing the I/O across multiple masters may require additional information provided to the schedule generator so that it can define a common "synchronization point" for all the I/O across various fieldbuses to be coordinated. Accordingly, in some embodiments, a decentralized distributed real time system may be provided that includes a plurality of interconnected master devices 306, where each master device has a plurality of slave devices 308 connected to the master device. Each slave device may be configured to perform physical input operations and generate streams to send to its master device, and/or to perform physical output operations and consume streams from its master device.

Each master device may include one or more timed functions and a network interface. Each timed function may be configured to control timing of the physical input operations and/or physical output operations for the plurality of slave devices. The network interface may be configured to communicate streams to and from other master devices based on a schedule. In some embodiments, the schedule may include a schedule for execution and coordination of the timed functions of the master device, and a schedule for transmission of the streams produced by the master device to other master devices.

Each timed function may be configured to export temporal properties regarding execution of the timed function, and coordination of the physical input operations and/or physical output operations of slave devices under control of the timed function with respect to other timed functions. Each timed function may also be configured to export associations (of the timed function) with streams between the master device and other master devices, i.e., an indication as to which real time data streams (to or from other master devices) are produced or consumed by the timed function.

The schedule for each master device may be generated based at least in part on the temporal properties and the associations, and these schedules may be used by the master devices to control execution of the timed functions and the streams between the master devices in real time in a coordinated manner. In various embodiments, the other timed functions may include one or more of: timed functions on the same master device, or timed functions on other master devices.

In some embodiments, the decentralized distributed real time system may further include at least one centralized configuration device 302, coupled to the plurality of master devices. For example, the at least one schedule generator may be configured to receive temporal properties from respective timed functions executing on the master devices, and receive associations between the timed functions and the streams between master devices, and generate respective schedules for the master devices based at least in part on the temporal properties and the associations. The at least one schedule generator may also be configured to distribute the respective schedules to the master devices.

Additionally, in some embodiments, the at least one schedule generator may also be configured to receive system application requirements, as well as network constraints and network topology information. The respective schedule for each master device may be generated based further on the system application requirements, and the network constraints and network topology information.

Therefore, in system 300 at least one schedule generator 302 may receive temporal properties from respective timed functions executing on master devices 306 with respective slave devices 308, each slave device configured to perform physical input operations and generate streams to send to its respective master, and/or perform physical output operations and consume streams from its respective master. Each master may include one or more timed functions configured to control timing of the physical input and/or output operations, and a network interface for communicating streams to and from other masters. The schedule generator 302 may receive associations between the timed functions and the streams, and generate respective schedules for the masters based on the temporal properties and the associations, each including a schedule for execution and/or coordination of the timed functions, and/or for transmission of the streams, whereby each master may control and coordinate execution of the timed functions and thereby physical input/output and stream transmission and reception in real time.

The schedule generator 302 may compute future time events to start the operations for performing the physical input/output operations on the slave devices as well as transmission of streams between the master devices and between each master device and its slave devices. In many applications the start event may be confined to an asynchronous event, where the occurrence of the start event cannot therefore be scheduled a priori. To support the asynchronous event, a signal-based timing infrastructure may be shared between one or more slave devices connected to a master device or between one or more slave devices connected to different master devices. For example, in system 300 an explicit signal/timing bus 310 is connecting slave devices 308A-308G for the purpose of propagating asynchronous events. As seen in FIG. 3, the explicit signal-based connection 310 is in addition to the internal bus/network which connects the slave devices together to exchange data (streams). The signal-based connection 310 transports the asynchronous event for starting the physical input/output operation. To accommodate this functionality for devices that share the signal-based connection 310, the timed-functions referenced above may be further enhanced. The enhancements may enable easy transition of the timed-function between using future time events and using asynchronous events for starting the respective event(s) and their associated stream transmissions.

As mentioned above, system 300 is configured such that the master devices implementing the timed-functions can support asynchronous event-based starts in addition to future time event-based starts. This is made possible at least in part by the shared signal-based bus 310 connecting the slave devices 308A-308G, which allows propagation of the asynchronous event to start the timed-functions implemented on the master devices 306. The asynchronous event may be generated by any one of the slave devices which share the explicit signal-based connection 310. Slave devices that do not share this connection may not participate in an asynchronous event-based start.

Temporal Properties

Exemplary temporal properties (or parameters) of timed functions include, but are not limited to a minimum period, maximum period, delay time, worst case execution time, receive time and transit time.

Minimum period—this indicates the fastest rate supported by the timed function (where rate is the inverse of period). This information may be used by the schedule generator to define the fastest real time stream update rate for this function. Note that this property or parameter does not necessarily reflect the rate of the control loops encapsulated by the timed function; rather, it describes the fastest rate at which the function can accept a new update by a real time stream or provide data that can be transmitted using a real time stream.

Maximum period—this indicates the slowest rate supported by the timed function (again, where rate is the inverse of period). In case of measurement functions, this value relates to the maximum buffering that the master can accommodate for this timed function before it starts losing data.

Delay time—this is the minimum time used by the function to perform a synchronized operation (such as an input latch or an output update) after it has started. This time may be used by the schedule generator to schedule an appropriate start time for the timed function, and may ensure that the schedule generator calculates a synchronization point such that when the function executes, it has enough time to meet the synchronization point deadline, i.e., to have the appropriate state at the synchronization point. In some embodiments, in cases where the timed function has a faster local control loop rate (multiple input updates/output latches per timed function period), one of the iterations of the local control loop may coordinate with the synchronization point, which may allow timed functions with different rates to synchronize their input and output operations.

WCET—this is the worst case execution time of the timed function. This property or parameter may allow the schedule generator to determine the appropriate transmission time for a real time stream that is expected to carry the data produced by the timed function. In cases where the function has a faster local control loop rate, the WCET may determine (or specify) the number of iterations of the local control loop in one period of the real time stream (and thereby the timed function).

Rx (receive) copy time—this property or parameter is a per stream value which indicates the maximum amount of time that may elapse from the moment the last bit of data received over the network until the data is ready to be consumed by a timed function. This information may be used to ensure that the real time stream being received on a master device is scheduled such that there is enough time for the data to be made available in memory before the timed function starts executing.

Tx (transmit) copy time—this property or parameter is a per stream value which indicates the maximum time elapsed from the moment the timed function is finished writing data to the moment the first bit appears on the network. This information may be used to ensure that the real time stream being transmitted from a master device is scheduled such that there is enough time for the data to be made available in memory before the stream starts its transmission.

In some embodiments, both Rx copy time and Tx copy time may be aggregated when a timed function consumes or produces multiple real time streams. It should be noted that the above properties or parameters are exemplary only, and that other temporal properties or parameters may be used as desired. Additionally, these properties or parameters may be referred to by different names.

In some embodiments, the additional information may also include association of real time streams (to or from other master devices) with a timed function, i.e., an indication of the real time streams associated with the timed function that are targeted to or from other master devices. In some embodiments, there may be two types of association: the timed function either consumes the data contained in the stream or the function produces the data contained in the stream. In other words, the two types of association may include 1) association of a real time stream whose data are to be consumed by the timed function; or 2) association of a real time stream whose data are to be produced by the timed function. This information may be used by the schedule generator to ensure that it can align real time streams with the start and termination of a timed function.

Schedule Generation

Figure 4:
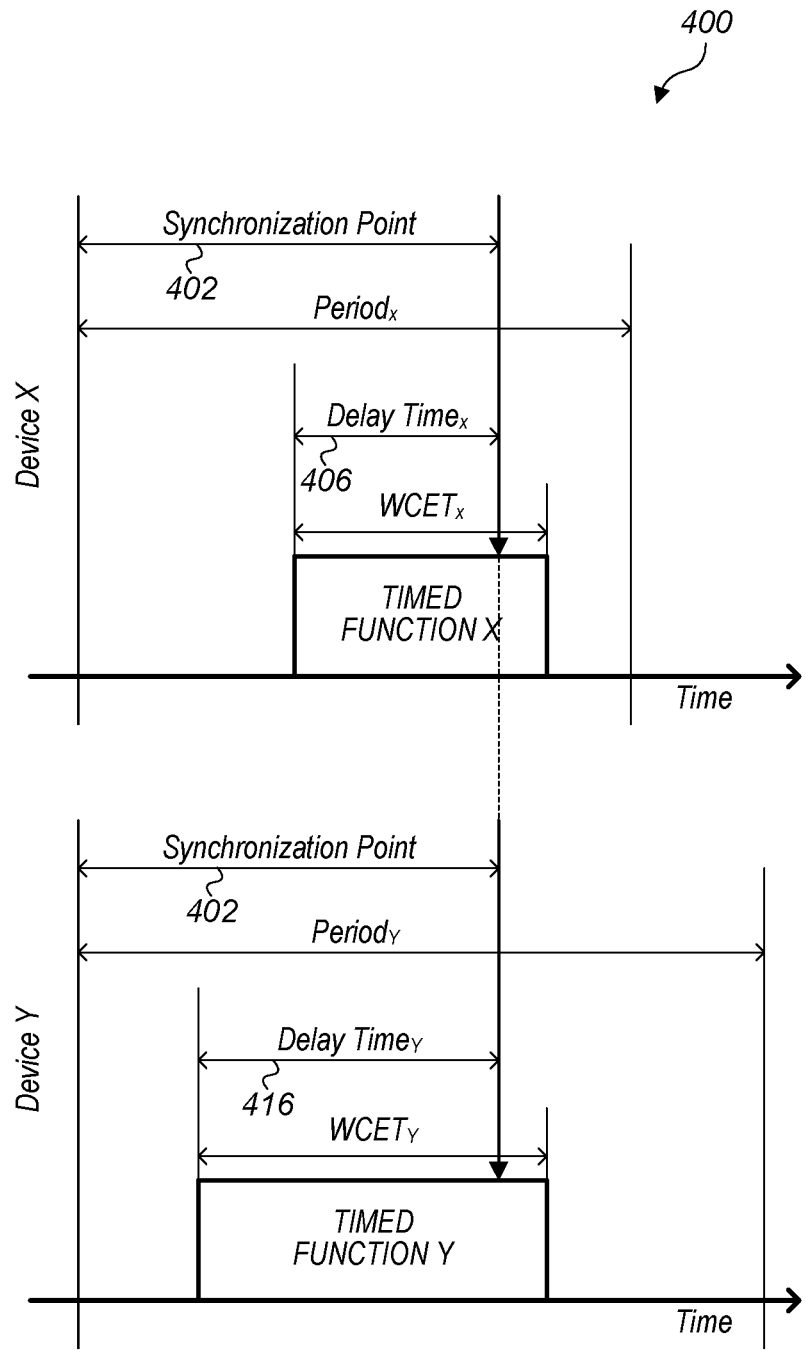
FIG. 4 illustrates a synchronization point for multiple devices in a decentralized distributed system, according to prior art.

The future time event may be generated by the schedule generator 302 and configured on the timed-function as "Synchronization Point". FIG. 4 illustrates an exemplary synchronization point 402 for multiple devices in a decentralized distributed system, according to some embodiments. As shown, the synchronization point 402 occurs during execution of the respective timed functions X and Y, and coincides with the expiry of the delay times 406 and 416 (respectively) for each. For example, the "Synchronization Point" may specify the point in time from a start of the cycle when the function should perform its physical input or physical output operation. The same "Synchronization Point" on disparate functions on the same or different master devices may indicate simultaneous input/output operations.

To accommodate the configuration of asynchronous event-based starts for physical input and output operations, a new parameter—e.g. a parameter designated as the Local Signal Group (LSG)—may be added to the timed-function. The new parameter LSG may be supported for (and by) any given master device that detects the shared signal-based conduits (e.g. signal-based bus 310 in FIG. 3) connecting one or more slave devices (e.g. slave devices 308A-308G in FIG. 3) controlled by timed-functions implemented on the given master device.

Local Signal Group (LSG) Object

A timed-function may provide a list of signal-based groups of which it may be a part if the slave devices that are controlled by the timed-function share one or more dedicated signal-based timing conduits with one or more other slave devices controlled by one or more other timed-functions on the same or different master device. The signal-based timing conduits may be implemented such that the that the time it takes for an asynchronous event—initiated/generated by one of the slave devices—to propagate to all other the other slave devices in the group can be characterized and has an upper bound (bounded latency). In other words, when the time duration of the propagation of a slave device initiated/generated asynchronous event can be characterized and has an upper bound, the signal-based timing conduits (e.g. signal-based bus 310 in FIG. 3) may be used for supporting asynchronous event-based starts of physical input and output operations.

In some embodiments the LSG parameter may include two sub-objects, an LSG description (LSGD) object and an LSG Configuration (LSGC) object.

The LSGD object may be devised to publish the array of LSGs of which a given function may be a part. Each LSG may indicate a unique signal-based connection infrastructure. For example a timed-function on a master device that is controlling the physical input/output on a slave device having two independent signal-based infrastructures connected to it may have two LSGs published in the LSGD parameter. For each LSG, the timed-function may list whether it is a master (can create the event) or a slave (consumer of the event). It may specify the worst case latency for the event, for example the maximum time taken for the event to be recognized and input/output operations performed upon recognition of the event. The LSGD object may be read by the centralized schedule generator (e.g. schedule generator 302 in FIG. 3) to determine the LSG capabilities of the (timed-) function. Below is an exemplary code segment illustrating one possible software implementation of the LSGD object.

```
<LSG 1 GUID, name 1>
        <Master or Slave> <master/slave>
        <Trigger latency> <ns>
<LSG 2 GUID, name 2>
        <Master or Slave> <master/slave>
        <Trigger latency> <ns>
...
<LSG n GUID, name n>
        <Master or Slave> <master/slave>
        <Trigger latency> <ns>
```

The LSGC object may contains the configuration for the specific timed-function. Based on application requirements and user configuration, for example, the timed-function may be configured to participate in one of the LSGs that the timed-function supports. The configuration may depend on the other timed-functions with which the given timed-function is synchronized to start. The object may be written to (may be updated/edited) by the centralized schedule generator. If the function is configured to participate as part of an LSG, the GUID/name (graphical user identification/name) of the LSG may be written to the LSGC object. Additionally a "Delay after Trigger" may be specified to ensure that all functions in this group simultaneously start their input/output operation. The delay may be calculated by the centralized schedule generator (e.g. 302 in FIG. 3) making it the largest of the trigger latency published by the functions included in the group. Below is an exemplary code segment illustrating one possible software implementation of the LSGC object.

```
<LSG GUID, name> <GUID, name>
        <Delay after trigger> <ns>
```

Figure 5:
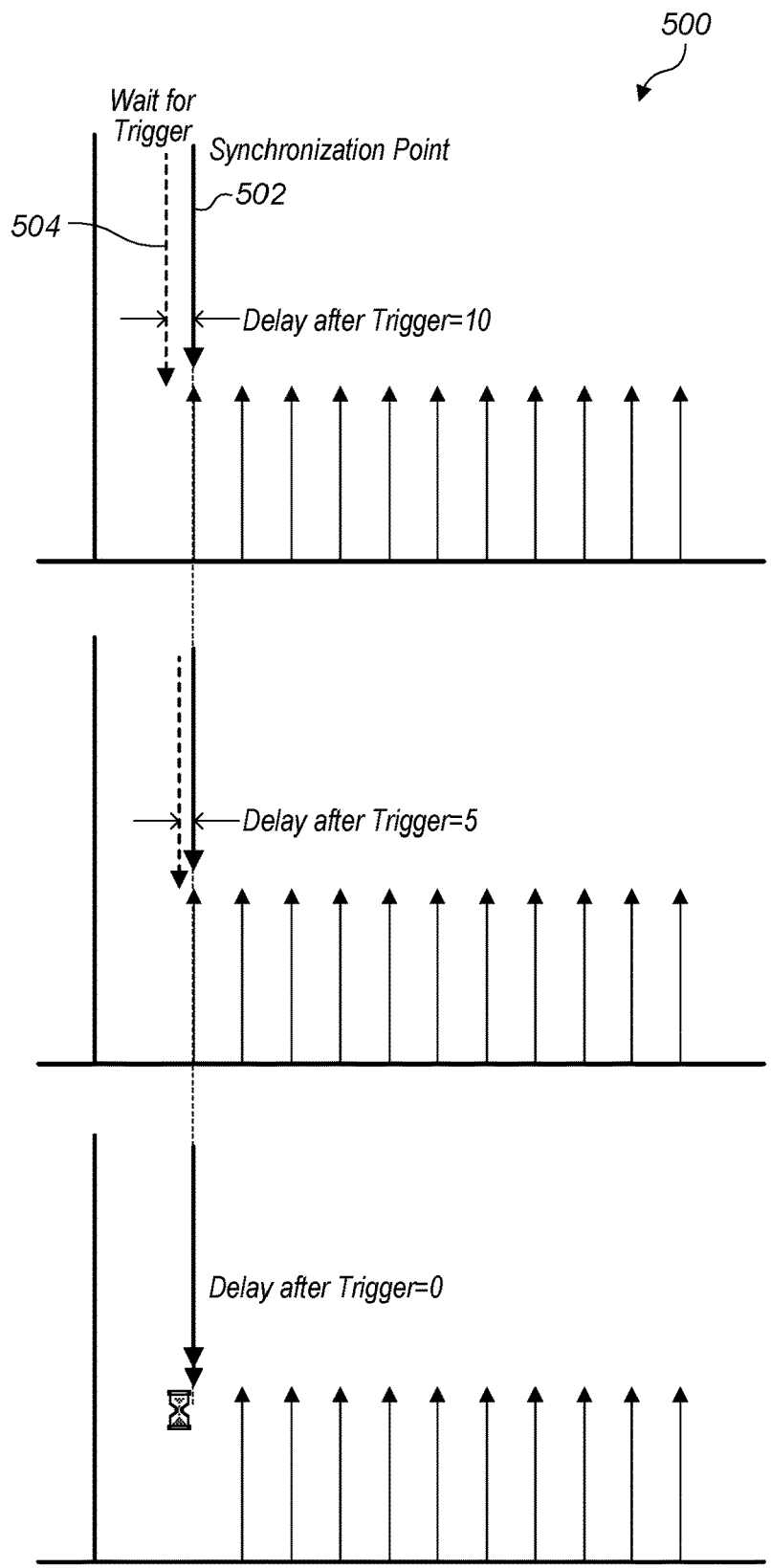
FIG. 5 is an exemplary timing diagram illustrating timed-functions configured to synchronize their starts using the same Local Signal Group for an asynchronous start event, according to some embodiments.

FIG. 5 shows an exemplary timing diagram illustrating the timing of three timed-functions that are configured as part of the same LSG. The intention of the timing diagram is to illustrate how the function with the minimum trigger (asynchronous event) latency is configured with the maximum delay after the trigger, which ensures that all functions perform their respective input/output operations at the same time. In the example shown in FIG. 5, a first function corresponding to the top diagram receives the trigger first, a second function corresponding to the middle diagram receives the trigger second, and a third function corresponding to the bottom diagram receives the trigger last. Accordingly, execution of the first function is delayed the longest (10) with respect to receiving the trigger, execution of the second function is delayed less (5), and execution of the third function does not need to be delayed with respect to receiving the trigger.

Behavior of a Timed-Function Configured to be Part of an LSG

A timed-function configured to be part of an LSG may operate in a similar manner as a timed-function waiting for a future time event, with certain modifications. The timed-function may (immediately) cause the all the slave devices (that are part of this timed-function) to perform all the necessary operations to get the slave devices ready (be armed) to perform their input/output operations, but instead of waiting for the time to match the future time event, the time-function causes the slave devices to wait indeterminately for the asynchronous event.

Figure 6:
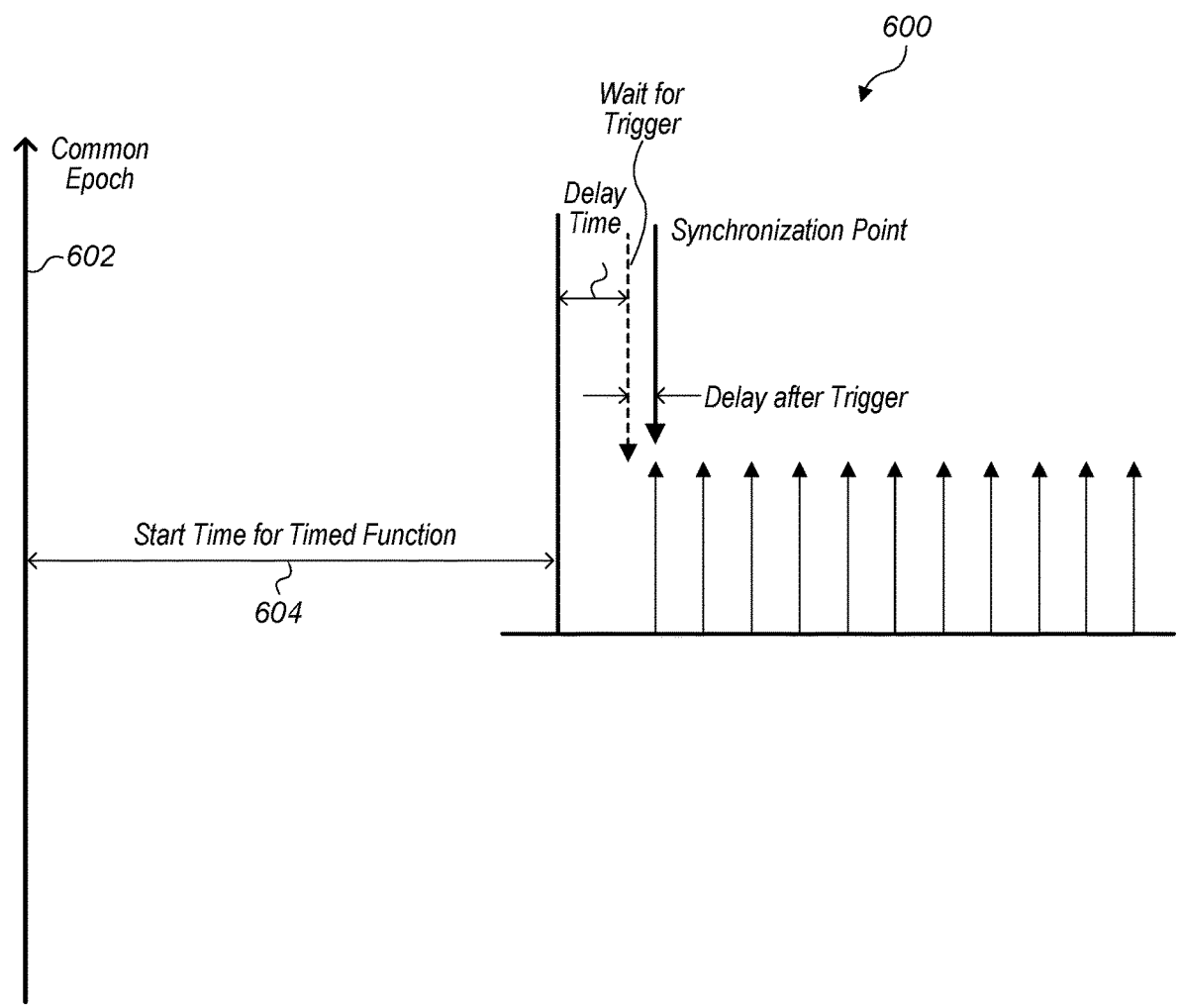
FIG. 6 is an exemplary timing diagram illustrating a timed-function configured for an asynchronous start and using a Local Signal Group, according to some embodiments.

Upon receiving the asynchronous event, the timed-function may wait for an additional time specified by the Delay after Trigger parameter in the LSG Configuration sub-object before performing the input/output operation(s) it is intended to perform. This operation is illustrated by way of the exemplary timing diagram 600 shown in FIG. 6. The Common Epoch 602 is a common epoch provided by the centralized schedule generator after it confirms that all devices implementing the timed-functions (which are to be synchronized) are ready and configured. The Start time for timed-function 604 represents a delay to the start of the timed-function, e.g. the number of periods to delay the start of the timed-function. This may be specified by the centralized schedule generator when a stream is to be scheduled periodically for this function, and the application does not want to lose any data acquired by the function.

Delay After Trigger represents a time duration for which the function may wait before starting/initiating the input or output operation(s). This value may be computed by the centralized schedule generator based on the maximum trigger latency from all the functions that are part of the same LSG. Delay Time is the same as described above with respect to operation of system 300. It is the amount of time that elapses while a function prepares for performing input/output operation(s). This may be useful in computing the future time event in case the function is configured for time. In the asynchronous start-event case, the maximum delay time from all the timed-functions of an LSG may specify the earliest point in time when an asynchronous event may occur (or take place) following system start-up, before a function can acknowledge it. The schedule generator may provide this value to the event generator (trigger master). Synchronization Point is equal to the delay after trigger and represents a relative time following arrival of the trigger. In contrast to the case where the timed-function is configured for a future time event as opposed to an asynchronous event-based start, the synchronization point is relative to the start time of the function (period of the function).

Figure 7:
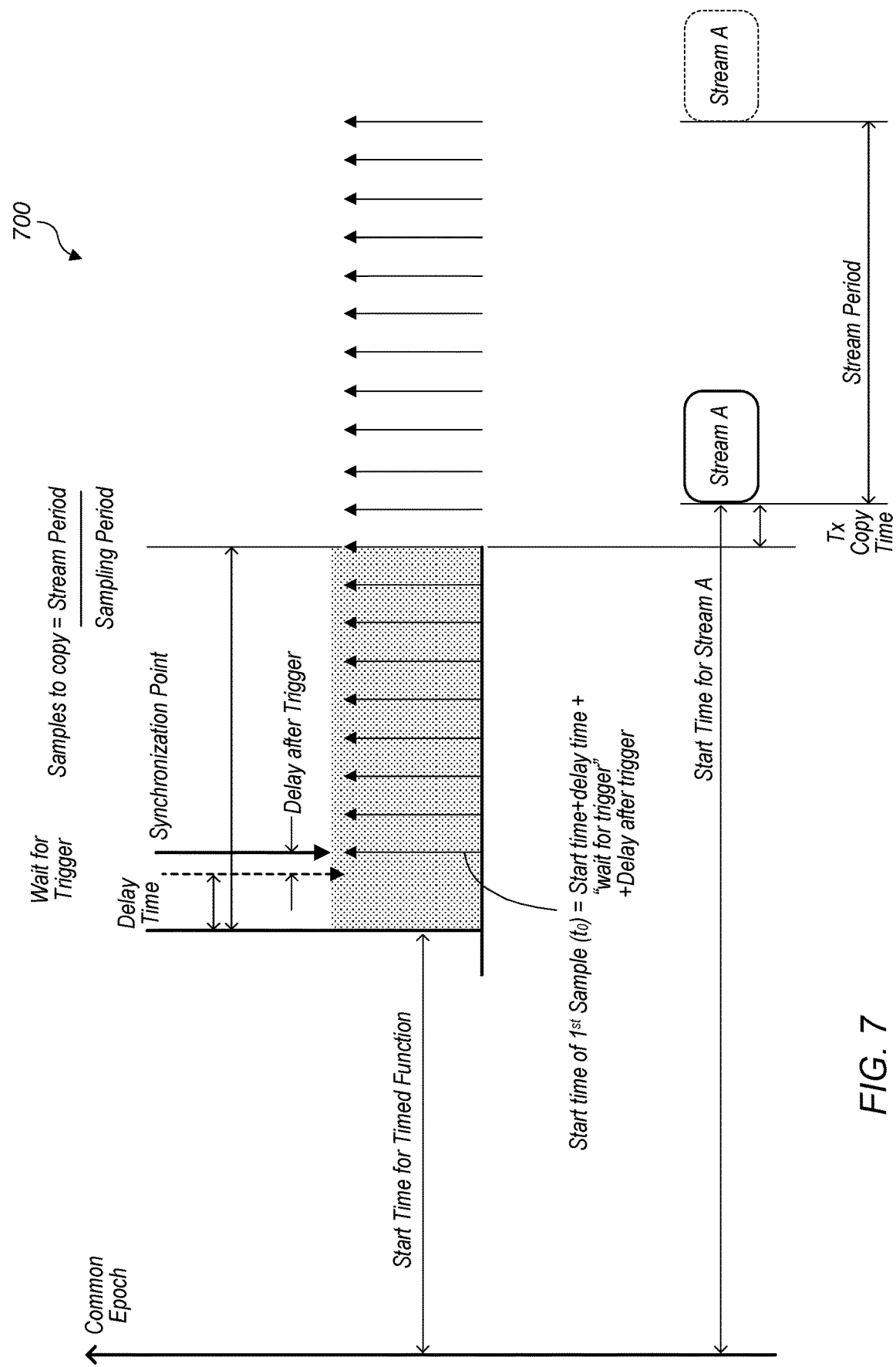
FIG. 7 is an exemplary timing diagram illustrating a timed-function configured for an asynchronous start and using a Local Signal Group with streams, according to some embodiments.

FIG. 7 shows an exemplary timing diagram illustrating timing associated with operation of a timed-function configured for an asynchronous event-based start associated with a scheduled stream transmitting the data produced by the function to another master device on the network. An isochronous data-acquisition model may be defined, according to which synchronized time may be used to start the acquisition and coordinate it with time-based stream transmission. The data-acquisition model may be augmented by the addition of the asynchronous event-based starting of the acquisition/generation, relating it to time-based stream transmission(s).

The schedule generator (e.g. 302 in FIG. 3) may be operated to configure the following parameters: stream period and start time of the stream.

The Stream Period may indicate the repeat interval of the stream and also signify the bandwidth used by the stream. This period divided by the sampling interval indicates the number of samples copied into the stream every period.

The Start time of the stream may indicate the number of periods by which the first iteration of the stream's period is delayed, to ensure that the timed-function is executed. In the case where the function is waiting for the asynchronous start event, the stream may not be transmitted and the bandwidth on the network may thereby be potentially wasted. Furthermore, once the asynchronous event takes place the first time, the number of samples (data) copied into the stream may be less than what is supported by the full bandwidth at which the stream operates, that is, the full number of samples the stream is configured to carry. This may happen because the function start may occur anywhere within the period of transmission.

Tx Copy Time is the same as previously defined with respect to system 300 and represents the time that elapses while the application copies the data into the transmission buffer. This value may be provided by the device and used by the Schedule Generator to compute the start time of the stream appropriately.

User Selected Asynchronous Trigger Source

According to at least the above disclosures, centralized configuration software may be implemented to allow a user to select the master (trigger source) for a LSG. Master devices may publish multiple functions where some functions specify slave configuration, while others specify master configuration. A user interacting with the centralized configuration software may select one out of the many master sources as the master trigger source for the LSG. The centralized configuration software may then provide the user information to the schedule generator which may accordingly configure the timed-functions (one as the master and the rest as slaves). The functions that are not configured as part of the LSG may be disabled. This allows for dynamic configuration where one master device may participate as the trigger generator for a first test setup and as a trigger consumer in a second test setup.

Thus, various embodiments of the techniques described herein may provide for improved control and other operations of decentralized distributed systems via the use of timed functions.

Exemplary Systems

Various embodiments disclosed herein may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others. However, it is noted that various embodiments may be used for a plethora of applications and is not limited to the above applications. In other words, applications discussed in the present description are exemplary only, and the disclosed embodiments may be used in any of various types of systems. Thus, embodiments of the system and method disclosed herein may be configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

The following describes various exemplary systems that may implement embodiments of the present techniques.

Figure 8A:
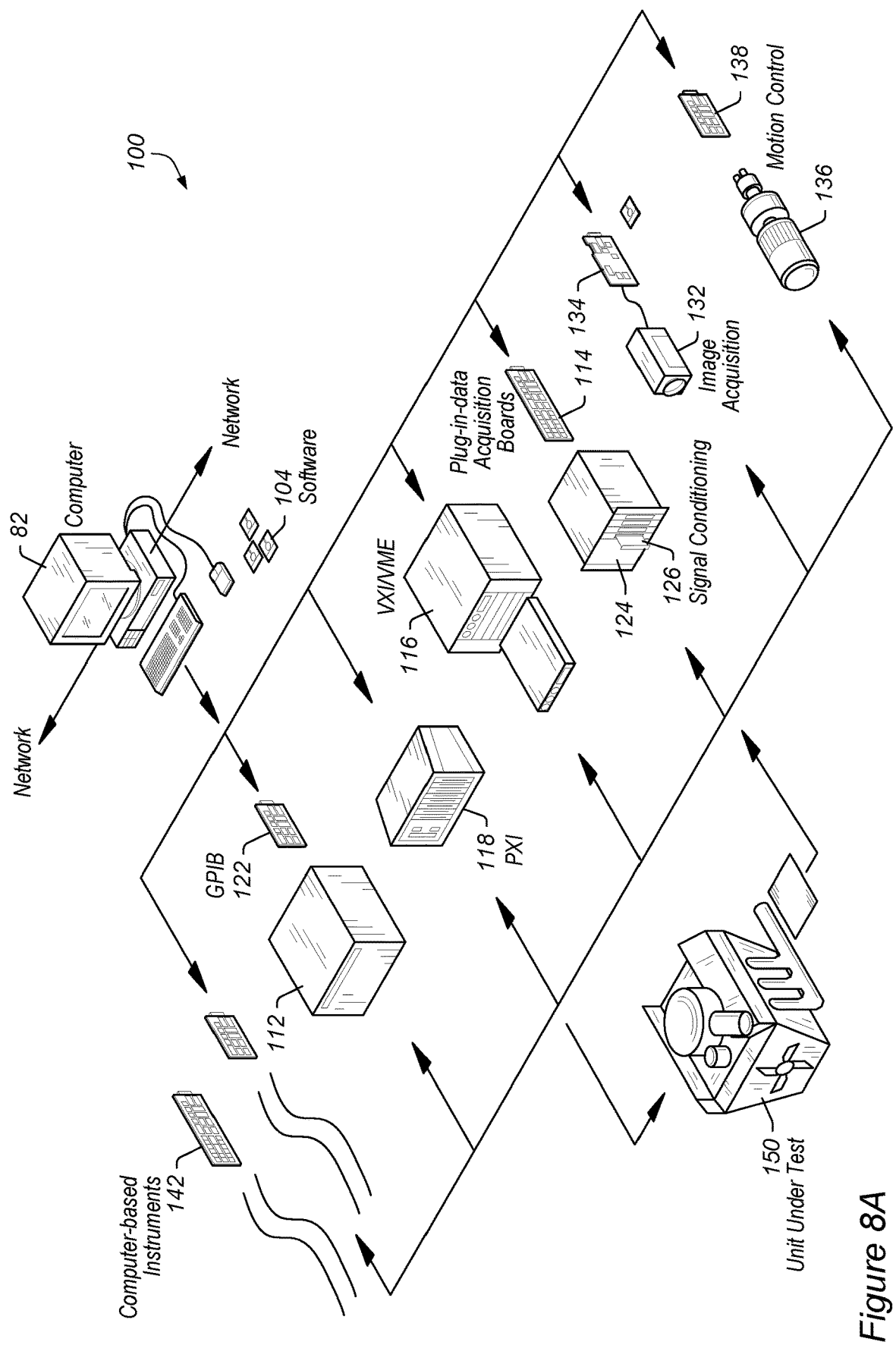
FIG. 8A illustrates an exemplary instrumentation control system according to some embodiments.

FIG. 8A illustrates an exemplary instrumentation control system 100 which may implement various embodiments disclosed herein. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 8B:
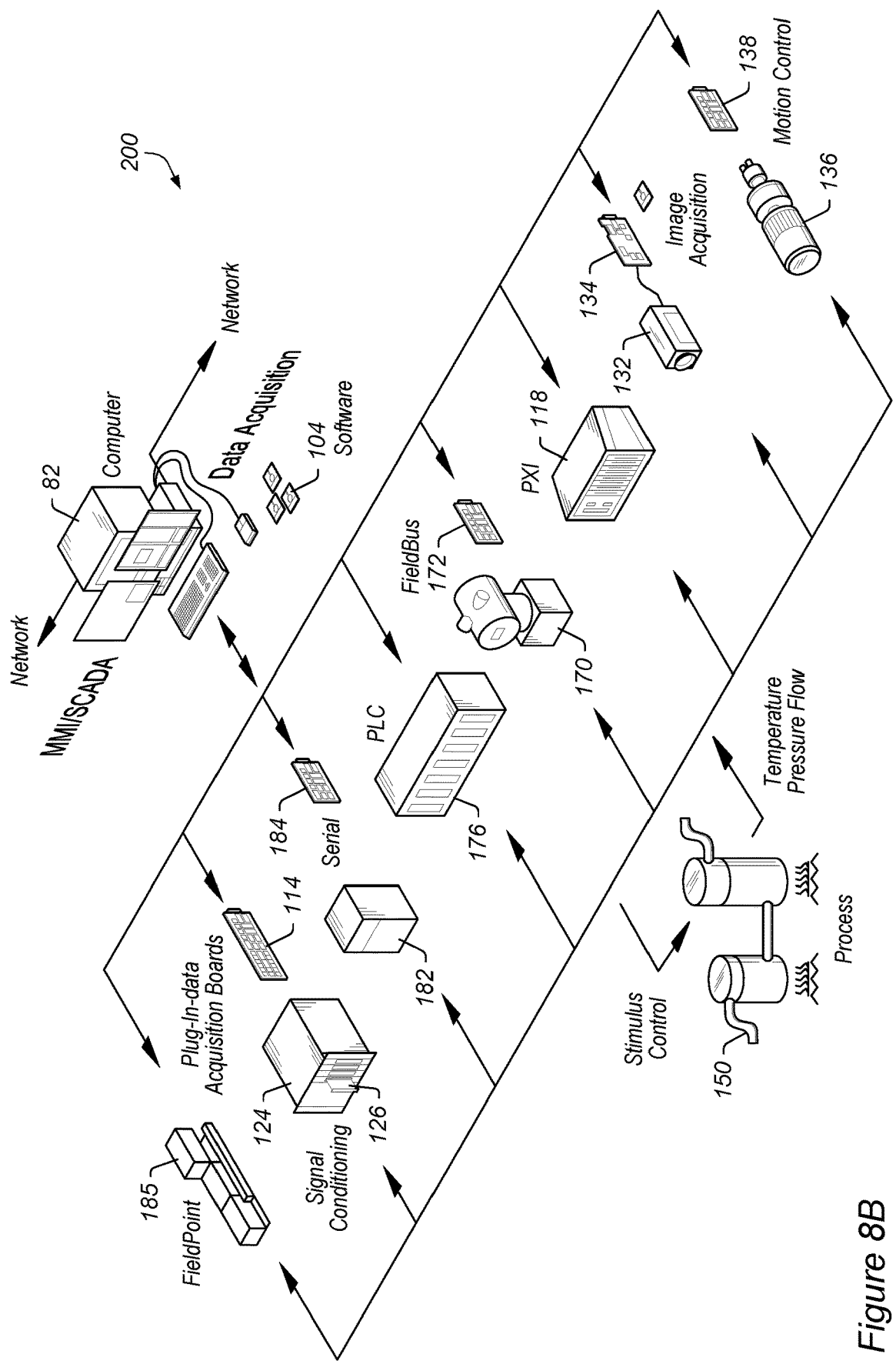
FIG. 8B illustrates an exemplary industrial automation system according to some embodiments.

FIG. 8B illustrates an exemplary industrial automation system 200 which may implement embodiments disclosed herein. The industrial automation system 200 is similar to the instrumentation or test and measurement system 100 shown in FIG. 17A. Elements which are similar or identical to elements in FIG. 17A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as HMI (Human Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as Fieldpoint system 185, available from National Instruments Corporation, among other types of devices.

Figure 9A:
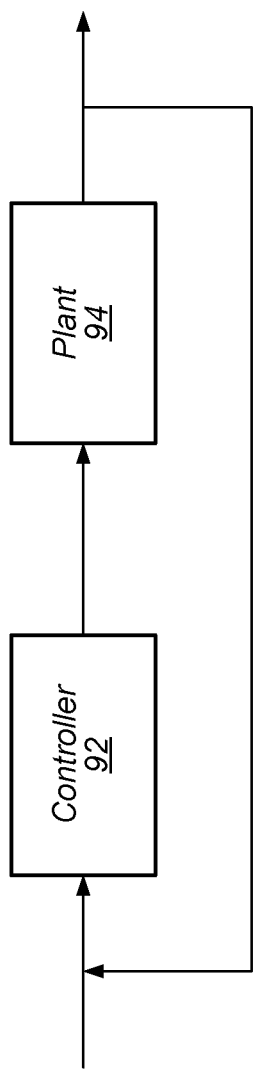
FIG. 9A is a high level block diagram of an exemplary system which may execute or utilize graphical programs, according to some embodiments.

FIG. 9A is a high level block diagram of an exemplary system which may execute or utilize graphical programs. FIG. 9A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 9B:
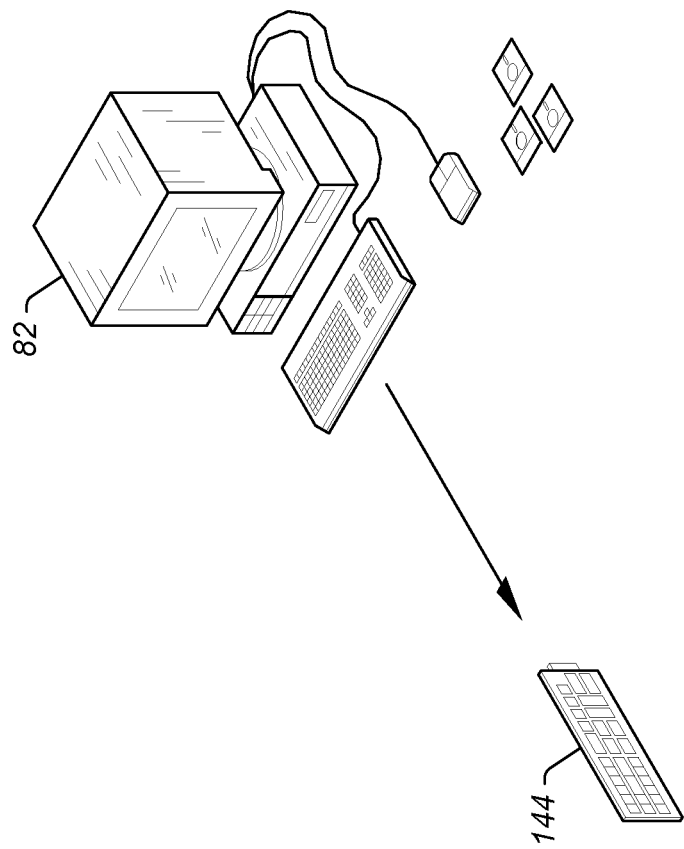
FIG. 9B illustrates an exemplary system which may perform control and/or simulation functions utilizing graphical programs, according to some embodiments.

FIG. 9B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In some embodiments, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In some embodiments, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 8A, 8B, and 9B above, one or more of the various devices may couple to each other over a network, such as the Internet. In one embodiment, the user operates to select a target device from a plurality of possible target devices for programming or configuration using program, e.g., a graphical program. Thus the user may create a (possibly graphical) program on a computer and use (execute) the program on that computer or deploy the program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 8A and 8B, may be referred to as virtual instruments. It should be noted that in various embodiments, one or more of the software (or firmware) program or components used to implement the present techniques, e.g., timed functions, schedule generator(s), etc., may be implemented in any kind of programs desired, including textual and/or graphical programs, e.g., graphical data flow programs.

Figure 10:
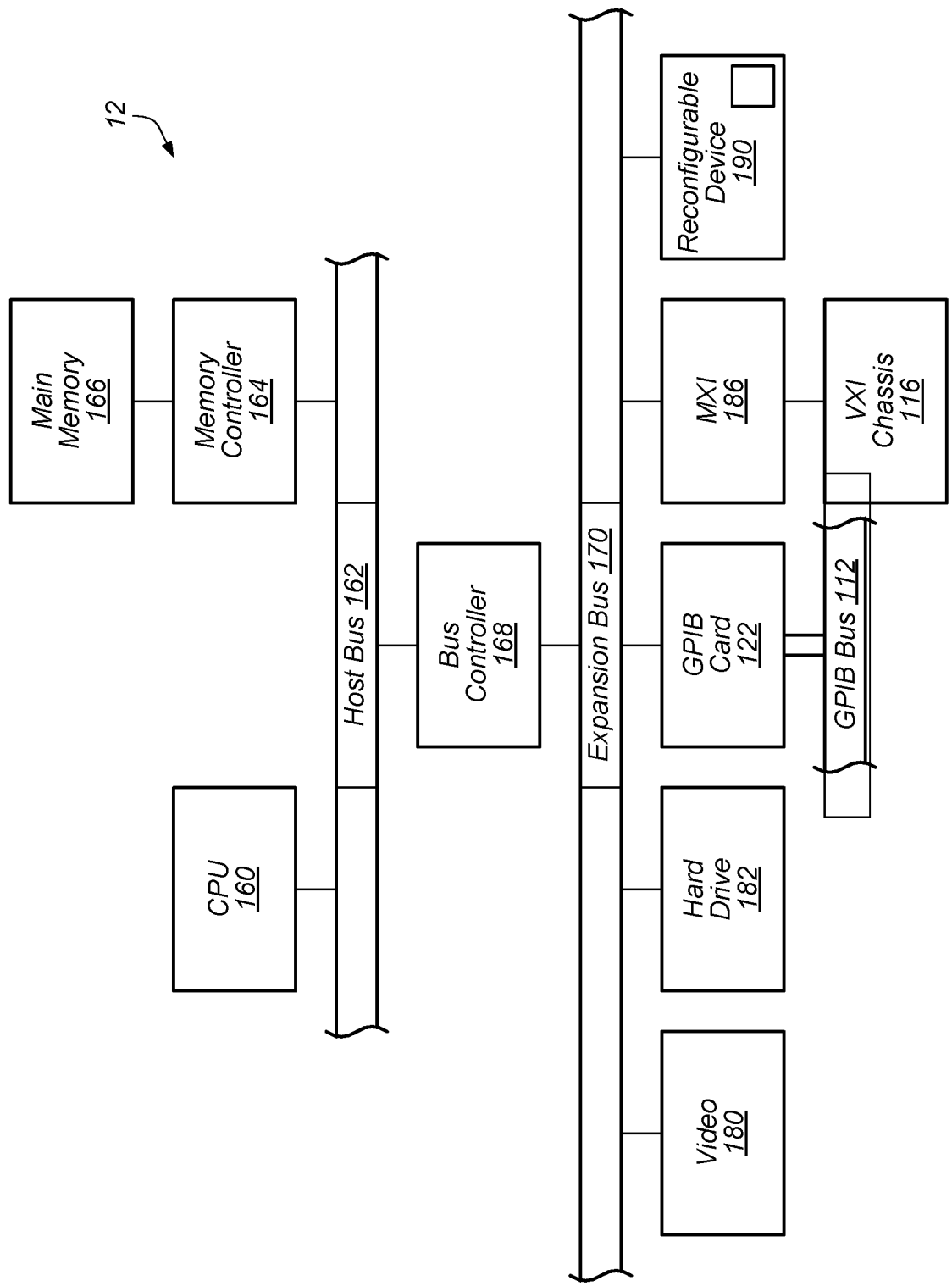
FIG. 10 is an exemplary block diagram of the computer systems of FIGS. 8A, 8B, 9A, and 9B, according to some embodiments.

FIG. 10—Computer System Block Diagram

FIG. 10 is a block diagram 12 representing one embodiment of the computer system 82 in FIGS. 8A, 8B, and 9B. It is noted that any type of computer system configuration or architecture can be used as desired, and FIG. 10 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, an Intel® Core™ i7 class, a CPU from the SPARC family of RISC processors, as well as others. A memory medium, typically comprising RAM and referred to as main memory, 166 is coupled to the host bus 162 by means of memory controller 164. The main memory 166 may store one or more programs implementing the techniques disclosed herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a (possibly graphical) program to the device 190 for execution of the program on the device 190. In some embodiments, the deployed program may be a graphical program, and may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. Alternatively, the program may be a textual program.

The following describes exemplary creation of a graphical program, according to one embodiment. First, a graphical user interface or front panel for the graphical program may be created, e.g., in response to user input. The graphical user interface may be created in any of various ways, e.g., depending on the graphical programming development environment used. A block diagram for the graphical program may be created. The block diagram may be created in or using any graphical programming development environment, such as LabVIEW, Simulink, VEE, or another graphical programming development environment. The block diagram may be created in response to direct user input, e.g., the user may create the block diagram by placing or "dragging and dropping" icons or nodes on the display and interconnecting the nodes in a desired fashion. Alternatively, the block diagram may be programmatically created from a program specification. The plurality of nodes in the block diagram may be interconnected to visually indicate functionality of the graphical program. The block diagram may have one or more of data flow, control flow, and/or execution flow representations.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

Other techniques for creating graphical programs may be used as desired, e.g., programmatically, or a combination of manual and programmatic techniques.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A decentralized distributed system, the system comprising:
 a plurality of master devices, each master device configured to couple to a respective plurality of slave devices via an internal network to exchange data streams, wherein at least two slave devices of the respective pluralities of slave devices are further interconnected via a shared signal-based bus in addition to being connected to corresponding master devices of the plurality of master devices via the internal network;
 wherein each master device is configured to implement one or more timed-functions configured to control timing of physical input operations and/or physical output operations for the respective plurality of slave devices, and streams between the master device and the respective plurality of slave devices;
 wherein the shared signal-based bus is configured to propagate an asynchronous event to start at least one of the one or more timed functions implemented on a master device of the corresponding master devices.

2. The system of claim 1, wherein the asynchronous event is generated by one of the at least two slave devices.

3. The system of claim 1, wherein slave devices of the respective plurality of slave devices that are not interconnected via the shared signal-based bus do not participate in an asynchronous event-based start.

4. The system of claim 1, wherein at least one timed-function of the one or more timed-functions comprises a local signal group parameter identifying the at least two slave devices interconnected via the shared signal-based bus as unique signal-based connection infrastructure.

5. The system of claim 4, wherein the local signal group parameter comprises:
 a description object comprising a listing of all unique signal-based connection infrastructures with which the at least one timed-function can be associated; and
 a configuration object comprising configuration information for the at least one timed-function indicating whether the at least one timed-function participates in one of the unique signal-based connection infrastructures supported by the at least one timed-function.

6. The system of claim 5, wherein for each respective unique signal-based connection infrastructure of all the unique signal-based connection infrastructures the description object further indicates whether the timed-function is a creator of the asynchronous event or a consumer of the asynchronous event.

7. The system of claim 5, wherein the description object further indicates a latency limit for the asynchronous event, wherein the latency limit specifies a maximum time period during which the asynchronous event is expected to be recognized.

8. The system of claim 5, further comprising:
at least one centralized configuration device configured to implement at least one schedule generator, wherein the at least one centralized configuration device is coupled to the plurality of master devices;
wherein in implementing the schedule generator the at least one centralized configuration device is configured to:
read the description object to determine unique signal-based connection infrastructure capabilities of the at least one timed-function; and
write the configuration information to the configuration object.

9. A method for executing physical input and output operations based on an asynchronous event-based start, the method comprising:
implementing one or more timed-functions by each master device of a plurality of master devices, wherein each master device is coupled to a respective plurality of slave devices via an internal network to exchange data streams, wherein at least a set of slave devices of the respective pluralities of slave devices are further interconnected via a shared signal-based bus in addition to being connected to corresponding master devices of the plurality of master devices via the internal network, wherein the one or more timed-functions are configured to control timing of physical input operations and/or physical output operations for the respective plurality of slave devices, and streams between the master device and the respective plurality of slave devices;
generating an asynchronous event;
propagating the asynchronous event over the shared signal-based bus; and
the set of slave devices starting specified physical input operations and/or specified physical output operations at a point in time defined by the asynchronous event.

10. The method of claim 9, further comprising generating the asynchronous event by one of the set of slave devices.

11. The method of claim 9, wherein at least one timed-function of the one or more timed-functions comprises a local signal group parameter identifying the at least two slave devices interconnected via the shared signal-based bus as a local signal group.

12. The method of claim 11, wherein the local signal group parameter comprises:
a description object comprising a listing of all unique local signal groups with which the at least one timed-function can be associated; and
a configuration object comprising configuration information for the at least one timed-function indicating whether the at least one timed-function participates in one of the local signal groups supported by the at least one timed-function.

13. The method of claim 12, wherein for each respective local signal group of all the local signal groups the description object further indicates whether the timed-function is a creator of the asynchronous event or a consumer of the asynchronous event.

14. The method of claim 12, wherein the description object further indicates a latency limit for the asynchronous event, wherein the latency limit specifies a maximum time period during which the asynchronous event is expected to be recognized.

15. The method of claim 12, further comprising:
implementing, by a centralized configuration device coupled to the plurality of master devices, at least one centralized schedule generator, said implementing the at least one centralized schedule generator comprising:
reading, by the centralized configuration device, the description object to determine unique signal-based connection infrastructure capabilities of the at least one timed-function; and
writing, by the centralized configuration device, the configuration information to the configuration object.

16. The method of claim 11, further comprising:
performing, by the set of slave devices at least according to the timed-function, one or more operations required by the slave devices to become ready to perform specified physical input operations and/or specified physical output operations; and
waiting, by the set of slave devices at least according to the timed-function, at least until reception of the asynchronous event before performing the specified physical input operations and/or specified physical output operations.

17. The method of claim 16, further comprising:
waiting, by at least one slave device of the set of slave devices at least according to the timed-function, for a specified period of time from a point in time when the asynchronous event is received by the at least one slave device before performing the specified physical input operations and/or specified physical output operations.

18. A non-transitory computer accessible memory medium that stores program instructions are executable by at least one centralized configuration device to:
provide an option to select an asynchronous trigger source for a local signal group, wherein the local signal group defines a set of slave devices interconnected via a shared signal-based bus; and
configure at least one timed-function to use the selected asynchronous trigger source to generate at least one asynchronous event, wherein the at least one timed-function is implemented by at least one master device of a plurality of master devices, wherein each master device is coupled to a respective plurality of slave devices via an internal network to exchange data streams, wherein the set of slave devices is comprised in the respective pluralities of slave devices, wherein the set of slave devices are interconnected via the shared signal-based bus in addition to being connected to corresponding master devices of the plurality of master devices via the internal network, wherein the at least one timed-function is configured to control timing of physical input operations and/or physical output operations for the respective plurality of slave devices, and streams between the at least one master device and the respective plurality of slave devices, wherein the asynchronous event is propagated over the shared signal-based bus, and wherein the set of slave devices start specified physical input operations and/or specified physical output operations at a point in time defined by the asynchronous event.

19. The non-transitory computer accessible memory medium of claim 18, wherein the selected asynchronous trigger source is one of the plurality of master devices.

20. The non-transitory computer accessible memory medium of claim 18, wherein the at least one timed-function comprises a local signal group parameter identifying the set of slave devices interconnected via the shared signal-based bus as a local signal group.

* * * * *